United States Patent
Szeliski et al.

(10) Patent No.: US 6,348,918 B1
(45) Date of Patent: Feb. 19, 2002

(54) STEREO RECONSTRUCTION EMPLOYING A LAYERED APPROACH

(75) Inventors: Richard S. Szeliski, Bellevue; Padmananbhan Anandan, Issaquah, both of WA (US); Simon Baker, New York, NY (US)

(73) Assignee: Microsoft Corporation, Redmond, WA (US)

(*) Notice: Subject to any disclaimer, the term of this patent is extended or adjusted under 35 U.S.C. 154(b) by 0 days.

(21) Appl. No.: 09/045,519

(22) Filed: Mar. 20, 1998

(51) Int. Cl.[7] ............................................. G06T 15/00
(52) U.S. Cl. ........................................................ 345/419
(58) Field of Search ................................ 345/424, 431, 345/501, 419

(56) References Cited

U.S. PATENT DOCUMENTS

| | | | | |
|---|---|---|---|---|
| 5,469,536 A | * | 11/1995 | Blank .......................... | 345/431 |
| 5,568,401 A | * | 10/1996 | Narayanaswami ........... | 345/501 |
| 5,706,417 A | * | 1/1998 | Adelson ..................... | 345/429 |
| 6,052,124 A | * | 4/2000 | Stein et al. ................. | 345/419 |
| 5,963,201 A | * | 7/2000 | McGreggor et al. ......... | 345/431 |
| 6,081,269 A | * | 7/2000 | Quarendon .................. | 345/419 |
| 6,084,979 A | * | 7/2000 | McGreggor et al. ......... | 345/431 |

OTHER PUBLICATIONS

[ASB94] S. Ayer, P. Schroeter, and J. Bigün. Segmentation of moving objects by robust parameter estimation over multiple frames. In 3rd ECCV, pp. 316–327, 1994.

[BAHH92] J. R. Bergen, P Anandan, K .J. Hanna, and R. Hingorani. Hierarchical model–based motion estimation. In 2nd ECCV, pp. 237–252, 1992.

[BJ96] M .J. Black and A. D. Jepson. Estimating optical flow in segmented images using variable–order parametric models with local deformations. PAMI, 18(10):972–986, 1996.

[Bli94] J. F. Blinn. Jim Blinn's corner: Compositing, part 1: Theory. IEEE Computer Graphics and Applications, 14(5):83–87, Sep. 1994.

[CB97] M. C. Chiang and T. E. Boult. Local blur estimation and super–resolution. In CVPR '97, pp. 821–826, 1997.

[DP95] T. Darrell and A. P. Pentland. Cooperative robust estimation using layers of support. PAMI, 17(5):474–487, 1995.

(List continued on next page.)

Primary Examiner—Matthew Luu
Assistant Examiner—Chanté Harrison
(74) Attorney, Agent, or Firm—Lyon, Harr & DeFrank; Richard T. Lyon

(57) ABSTRACT

A system and method for extracting structure from stereo that represents the scene as a collection of planar layers. Each layer optimally has an explicit 3D plane equation, a colored image with per-pixel opacity, and a per-pixel depth value relative to the plane. Initial estimates of the layers are recovered using techniques from parametric motion estimation. The combination of a global model (the plane) with a local correction to it (the per-pixel relative depth value) imposes enough local consistency to allow the recovery of shape in both textured and untextured regions.

81 Claims, 9 Drawing Sheets

(2 of 9 Drawing Sheet(s) Filed in Color)-

OTHER PUBLICATIONS

[DTM96] P. E. Debevec, C. J. Taylor, and J. Malik. Modeling and rendering architecture from photographs: A hybrid geometry and image–based approach. In SIGGRAPH '96, pp. I 1–20, 1996.

[IAH95] M. Irani, P. Anandan, and S. Hsu. Mosaic based representations of video sequences and their applications. In 5th ICCV, pp. 605–611, 1995.

[IP92] M. Irani and S. Peleg. Image sequence enhancement using multiple motions analysis. In CVPR '92, pp. 216–221, 1992.

[IRP92] M. Irani, B. Rousso, and S. Peleg. Detecting and tracking multiple moving objects using temporal integration. In 2nd ECCV, pp. 282–287, 1992.

[KAH94] R. Kumar, P. Anandan, and K. Hanna. Direct recovery of shape from multiple views: A parallax based approach. In 12th ICPR, pp. 685–688, 1994.

[MP94] S. Mann and R. W. Picard. Virtual bellows: Constructing high quality stills from video. In 1st ICIP, pp. 363–367, 1994.

[SA96] H. S. Sawhney and S. Ayer. Compact representations for videos through dominant and multiple motion estimation PAMI, 18(8):814–830, 1996.

[SG97] R. Szeliski and P. Golland. Stereo matching with trans–parency and matting. In ICCV '98, pp. 517–524, 1998.

[SS97] R. Szeliski and H.-Y. Shum. Creating full view panoramic image mosaics and texture–mapped models. In SIGGRAPH '97, pp. 251–258, 1997.

[SS98] H.-Y. Shum and R. Szeliski. Construction and refinement of panoramic mosaics with global & local alignment. In ICCV '98, pp. 953–958, 1998.

[WA93] J. Y .A. Wang and E. H. Adelson. Layered representation for motion analysis. In CVPR '93, pp. 361–366, 1993.

[FL88] O.D. Faugeras and F. Lustman. Motion and structure from motion in a piecewise planar environment. International Journal of Pattern Recognition and Artificial Intelligence, 2(3):485–509, 1988.

[LF93] Q.-T. Luong and O. Faugeras. Determining the fundamental matrix with planes: Instability and new algorithms. In CVPR '93, pp. 489–494, 1993.

[VZR96] T. Viéville, C. Zeller, and L. Robert. Using collineations to compute motion and structure in an uncalibrated image sequence. IJCV, 20(3): 213–242, 1996.

\* cited by examiner

STEREO RECONSTRUCTION EMPLOYING A LAYERED APPROACH

BACKGROUND

1. Technical Field

The invention is related to stereo reconstruction, and more particularly, to a system and process for extracting 3D structure from plural, stereo, 2D images of a scene by representing the scene as a group of image layers.

2. Background Art

Extracting structure from stereo has long been an active area of research in the imaging field. However, the recovery of pixel-accurate depth and color information from multiple images still remains largely unsolved. Additionally, existing stereo algorithms work well when matching feature points or the interiors of textured objects. However, most techniques are not sufficiently robust and perform poorly around occlusion boundaries and in untextured regions.

For example, a common theme in recent attempts to solve these problems has been the explicit modeling of the 3D volume of the scene. The volume of the scene is first discretized, usually in terms of equal increments of disparity. The goal is then to find the so-called voxels which lie on the surfaces of the objects in the scene using a stereo algorithm. The potential benefits of these approaches can include, the equal and efficient treatment of a large number of images, the explicit modeling of occluded regions, and the modeling of mixed pixels at occlusion boundaries to obtain sub-pixel accuracy. However, discretizing space volumetrically introduces a huge number of degrees of freedom. Moreover, modeling surfaces by a discrete collection of voxels can lead to sampling and aliasing artifacts.

Another active area of research directed toward solving the aforementioned problems is the detection of multiple parametric motion transformations within image sequence data. The overall goal is the decomposition of the images into sub-images (or "layers") such that the pixels within each sub-image move consistently with a single parametric transformation. Different sub-images are characterized by different sets of parameter values for the transformation. A transformation of particular importance is the 8-parameter homography (collineation), because it describes the motion of points on a rigid planar patch as either it or the camera moves. The 8 parameters of the homography are functions of the plane equations and camera matrices describing the motion.

While existing layer extraction techniques have been successful in detecting multiple independent motions, the same cannot be said for scene modeling. For instance, the fact that the plane equations are constant in a static scene (or a scene imaged by several cameras simultaneously) has not been exploited. This is a consequence of the fact that, for the most part, existing approaches have focused on the two frame problem. Even when multiple frames have been considered, it has primarily been solely for the purposes of using past nsegmentation data to initialize future frames. Another important omission is the proper treatment of transparency. With a few exceptions, the decomposition of an image into layers that are partially transparent (translucent) has not been attempted.

SUMMARY

The present invention relates to stereo reconstructions that recover pixel-accurate depth and color information from multiple images, including around occlusion boundaries and in untextured regions. This is generally accomplished using an approach to the stereo reconstruction that represents the 3D scene as a collection of approximately planar layers, where each layer has an explicit 3D plane equation and a layer sprite image, and may also be characterized by a residual depth map. The layer sprite refers to a colored image with a defined per-pixel opacity (transparency). The residual depth map refers to a per-pixel depth value relative to the plane. The approach of segregating the scene into planar components allows a modeling of a wider range of scenes. To recover the structure of the scene, standard techniques from parametric motion estimation, image alignment, and mosaicing can be employed.

More specifically, the approach to the stereo reconstruction based on representing the 3D scene as a collection of approximately planar layers involves estimating the desired parameters (e.g. plane equation, sprite image and depth map) by processing several computer program modules, some of which are optional depending on the desired accuracy of the result. The full approach, which is believed to provide the best estimate of the layer parameters, and so the structure of the 3D scene, includes:

(a) inputting plural 2D images as well as camera projection matrices defining the location and orientation of the camera(s) responsible for creating each image, respectively;

(b) assigning each pixel making up each 2D image to one of the plural layers;

(c) estimating a plane equation for each layer that defines the orientation and position of that layer in 3D space;

(d) estimating a sprite image for each layer characterized by a per-pixel color and a per-pixel opacity;

(e) estimating a residual depth map for each layer wherein each residual depth map defines the distance each pixel of the associated layer is offset from the estimated plane of that layer;

(f) re-estimating each layer's sprite image based on the residual depth map associated with the layer;

(g) re-assigning pixels assigned to a particular layer to another layer by using the estimates for the plane equation, sprite image, and residual depth map for each layer as a guide;

(h) iteratively repeating steps (c) through (g) for each layer until the change in the value of at least one layer parameter relative to its value in an immediately preceding iteration falls below a prescribed threshold assigned to the parameter; and (i) outputting data representative of the plane equation, sprite image and residual depth map estimates for each layer.

Only the input, pixel assignment, plane equation and sprite image estimation, and output modules (less the residual depth map) are necessary to produce a useable layered representation of the scene. However, the accuracy of the layered representation can be progressively improved with the respective addition of each of the remaining modules, i.e. the depth map estimation, sprite image re-estimation, and pixel re-assignment and iteration modules.

The layered approach to stereo reconstruction shares many of the advantages of the previously described volumetric approaches because the 3D information contained in the layers is used to reason about occlusion and mixed pixels. However, the layered approach according to the present invention offers a number of additional advantages, including:

A combination of the global model (the plane) and the local correction to it (the per-pixel depth map) that results in very robust performance and extremely accurate depth maps;

A layered approach that enables the recovery of scene structure in untextured regions because there is an implicit assumption that untextured regions are planar—this is not an unreasonable assumption, especially in man-made environments;

A form of the output (i.e., a collection of approximately planar regions with per-pixel depth offsets) that is more suitable than a discrete collection of voxels for many applications, including, view interpolation and interactive scene modeling for rendering and video parsing.

In addition to the just described benefits, other advantages of the present invention will become apparent from the detailed description which follows hereinafter when taken in conjunction with the drawing figures which accompany it.

DESCRIPTION OF THE DRAWINGS

The file of this patent contains at least one drawing executed in color. Copies of this patent with color drawings (s) will be provided by the Patent and Trademark Office upon request and payment of the necessary fee.

The specific features, aspects, and advantages of the present invention will become better understood with regard to the following description, appended claims, and accompanying drawings where:

DETAILED DESCRIPTION OF THE PREFERRED EMBODIMENTS

In the following description of the preferred embodiments of the present invention, reference is made to the accompanying drawings which form a part hereof, and in which is shown by way of illustration specific embodiments in which the invention may be practiced. It is understood that other embodiments may be utilized and structural changes may be made without departing from the scope of the present invention.

Figure 1:
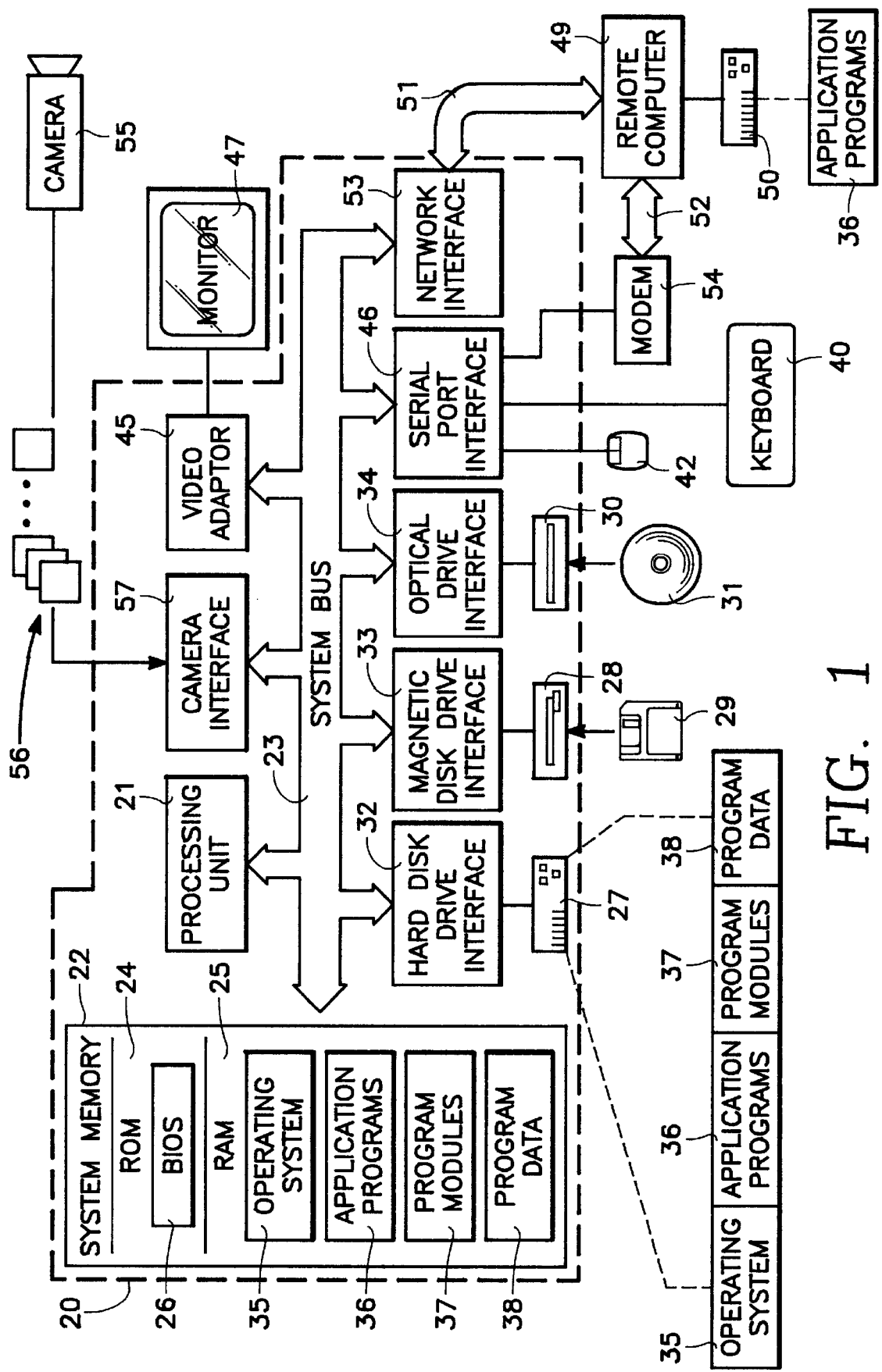
FIG. 1 is a diagram depicting a general purpose computing device constituting an exemplary system for implementing the present invention.

FIG. 1 and the following discussion are intended to provide a brief, general description of a suitable computing environment in which the invention may be implemented. Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a general purpose computing device in the form of a conventional personal computer 20, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system 26 (BIOS), containing the basic routine that helps to transfer information between elements within the personal computer 20, such as during start-up, is stored in ROM 24. The personal computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide nonvolatile storage of computer readable instructions, data structures, program modules and other data for the personal computer 20. Although the exemplary environment described herein employs a hard disk, a removable magnetic disk 29 and a removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs), read only memories (ROMs), and the like, may also be used in the exemplary operating environment.

A number of program modules may be stored on the hard disk, magnetic disk 29, optical disk 31, ROM 24 or RAM 25, including an operating system 35, one or more application programs 36, other program modules 37, and program data 38. A user may enter commands and information into the personal computer 20 through input devices such as a keyboard 40 and pointing device 42. Of particular significance to the present invention, a camera 55 (such as a digital/electronic still or video camera, or film/photographic scanner) capable of capturing a sequence of images 56 can also be included as an input device to the personal computer 20. The images 56 are input into the computer 20 via an appropriate camera interface 57. This interface 57 is connected to the system bus 23, thereby allowing the images to be routed to and stored in the RAM 25, or one of the other data storage devices associated with the computer 20. However, it is noted that image data can be input into the computer 20 from any of the aforementioned computer-readable media as well, without requiring the use of the camera 55. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port or a universal serial bus (USB). A monitor 47 or other type of display device is also connected to the system bus 23 via an interface, such as a video adapter 48. In addition to the monitor, personal computers typically include other peripheral output devices (not shown), such as speakers and printers.

The personal computer 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets and the Internet.

When used in a LAN networking environment, the personal computer 20 is connected to the local network 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

Figure 2:
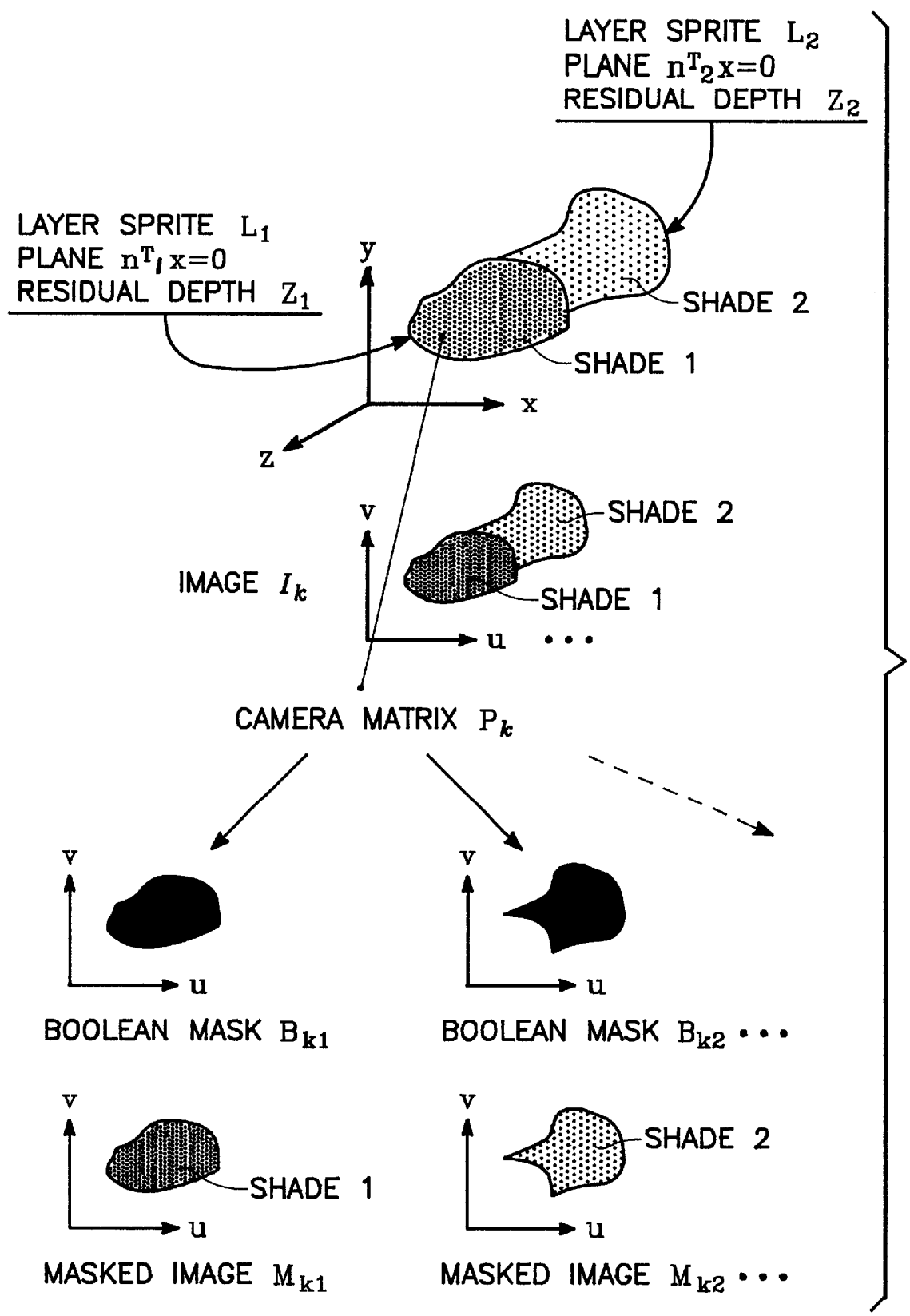
FIG. 2 is a diagram graphically depicting the basic concepts of the layered stereo reconstruction approach according to the present invention.

The exemplary operating environment having now been discussed, the remaining part of this description section will be devoted to a description of the program modules embodying the invention and the testing of these modules. Unless stated otherwise, the following description employs homogeneous coordinates for both 3D world coordinates $X=(x, y, z, 1)^T$ and for 2D image coordinates $u=(u, v, 1)^T$. In addition, it is assumed that when indexing 2D images, the homogeneous coordinates are converted into 2D pixel indices via conventional methods before accessing the array containing the image. Referring now to FIG. 2, suppose K images $I_1(u_1), I_2(u_2), \ldots, I_K(u_K)$ captured by K cameras with projection matrices $P_1, P_2, \ldots, P_K$. In what follows, the image coordinates $u_k$ will be dropped unless they are needed to explain a warping operation explicitly.

The basic concept is that the world can be reconstructed as a collection of L approximately planar layers. A sprite image of a layer is denoted by $L_l(u_l)=(\alpha_l \cdot r_l, \alpha_l \cdot g_l, \alpha_l \cdot b_l, \alpha_l)$ where $r_l=r_l(u_l)$ is the red band, $g_l=g_l(u_l)$ is the green band, $b_l=b_l(u_l)$ is the blue band, and $\alpha_l=\alpha_l(u_l)$ is the opacity of pixel $u_l$. Each layer is also associated with a homogeneous vector $n_l$, which defines the plane equation of the layer via $n_l^T X=0$, and optionally a per-pixel residual depth offset $Z_l(u_l)$. Thus, the scene is represented by L sprite images $L_l$ on planes $n_l^T X=0$ with potential depth offsets $Z_l$.

Many of the techniques from parametric motion estimation that are preferably used herein to estimate the layer parameters $L_l$, $n_l$, and $Z_l$, require an assumption of boolean valued opacities where a pixel in an image is characterized as being either completely opaque or completely transparent. As a consequence, these boolean opacities will be assumed for the purposes of the following discussion. However, it is not intended that the present invention be limited to the assumption of boolean opacities. Rather, techniques for estimating the layer parameters which employ real-valued opacities may be used instead.

The estimation approach embodying the present invention can be subdivided into a number of steps for respectively estimating $L_l$, $n_l$, and $Z_l$. To compute these quantities, we need to add auxiliary boolean mask images $B_{kl}$. The boolean masks $B_{kl}$ denote the pixels in image $I_k$ which are images of points in layer $L_l$. In other words, the mask images $B_{kl}$, define which pixels are in a particular layer. Since we are assuming boolean opacities, $B_{kl}=1$ if and only if $L_l$ is the front-most layer which is opaque at that pixel in image $I_k$. Hence, in addition to $L_l$, $n_l$, and $Z_l$, we also need to estimate the boolean masks $B_{kl}$. Once we have estimated these masks, we can compute masked input images $M_{kl}=B_{kl} I_k$.

Figure 3:
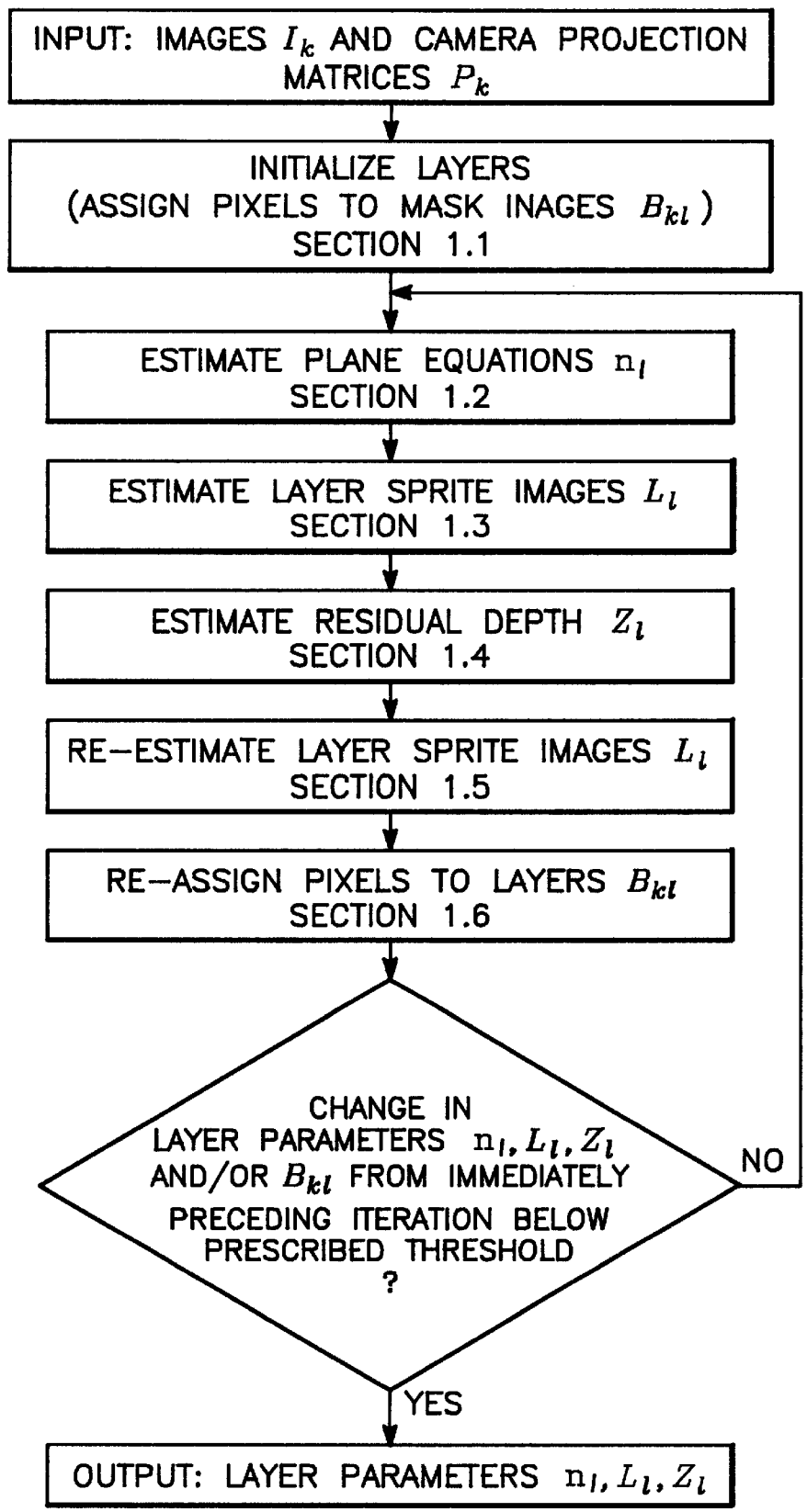
FIG. 3 is a block diagram of an overall process for stereo reconstruction according to the present invention.

FIG. 3 illustrates the high-level structure of the subject layered stereo reconstruction approach. The input consists of the aforementioned collection of images $I_K$ (taken with cameras of known geometry $P_k$. The goal is to estimate the layer sprites $L_l$, the plane vectors $n_l$, and the residual depths $Z_l$. Given any three of $L_l$, $n_l$, $Z_l$ and $B_{kl}$, there are techniques for estimating the remaining one. The approach generally consists of first initializing these quantities. Then, each of these quantities is in turn iteratively estimated while fixing the other three. In the following discussion, each of the steps in the approach is discussed in detail. Then, results of experimentation with a tested embodiment of the invention will be described.

Additionally, in the remainder of this specification, the description refers to various individual publications identified by an alphanumeric designator contained within a pair of brackets. For example, such a reference may be identified by reciting, "reference [WA93]" or simply "[WA93]". Multiple references will be identified by a pair of brackets containing more than one designator, for example, [WA93, SA96, BJ96]. A listing of the publications corresponding to each designator can be found at the end of this Detailed Description section.

1. Computation of Layers Using Boolean Opacities 1.1 Initialization of Layers

Initialization of the layers is a process by which the pixels forming the images are initially assigned to a particular layer, thereby segmenting the images. The Boolean mask images $B_{kl}$, and so the masked input images $M_{kl}$ are defined from this initial assignment of pixels. There are a number of methods of initializing the layers. One way is to initialize a large number of small random layers, which are then allowed to grow and merge until a small number of larger layers remain which accurately model the scene. Such an approach was employed in references [WA93, SA96, BJ96].

A second approach would be to use a sequential method in which a dominant motion is first extracted and then the residual regions are processed recursively. This method was employed in references [IAH95, SA96]. A third possibility would be to perform a color or intensity segmentation in each image as used in reference [ASB94]. The resulting segments could be matched and used as initial layer assignments. A fourth approach consists of first applying a conventional stereo algorithm to get an approximate depth map. A plane fitting algorithm could then be used to initialize the layers. A final method would be to get a user to initialize the layers manually. In many applications, such as model acquisition [DTM96] and video parsing [SA96], the goal is a semi-automatic process where limited user input is acceptable.

1.2 Estimation of Plane Equations

Figure 4:
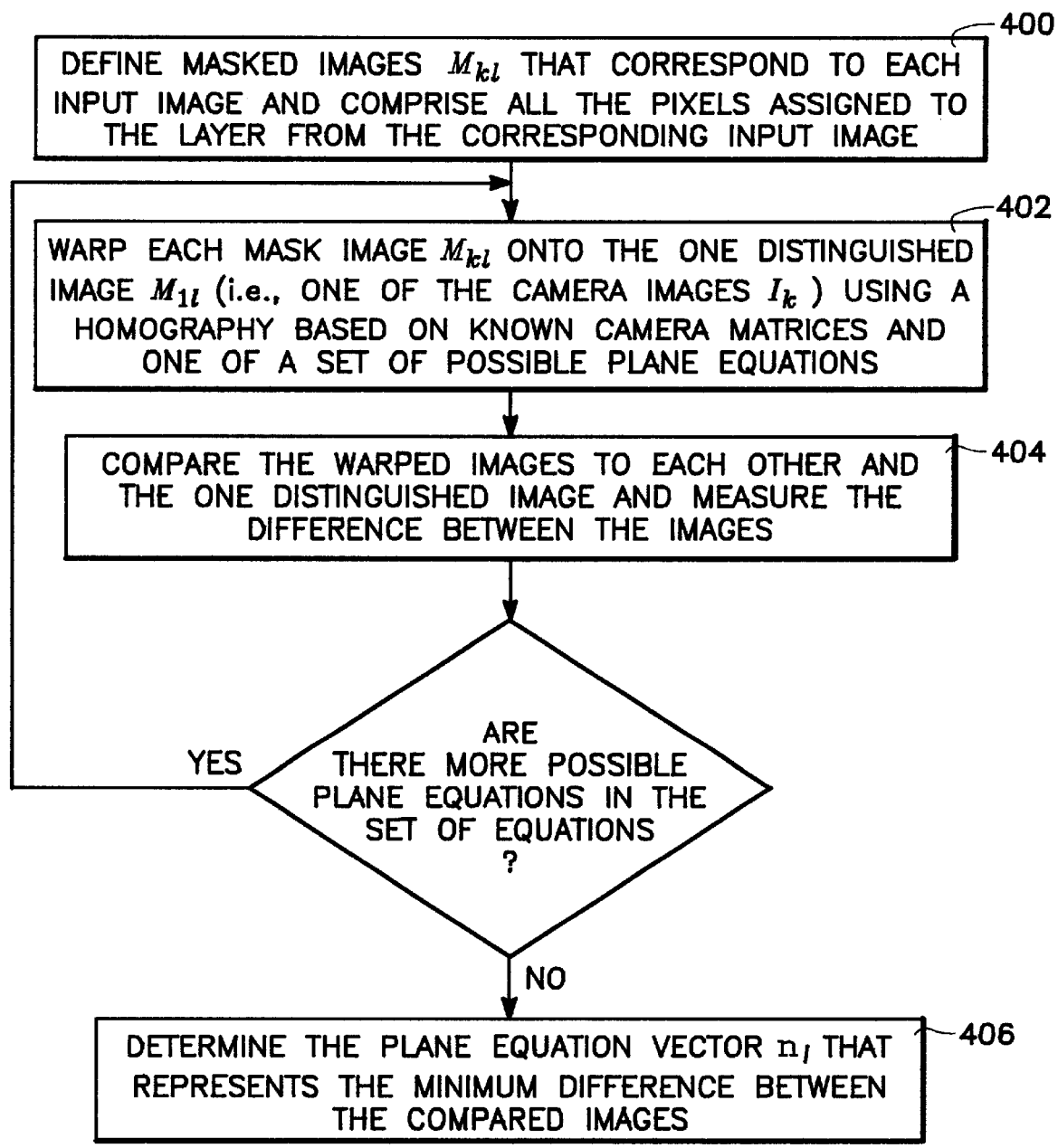
FIG. 4 is a block diagram of a process for accomplishing the plane equation estimation module of the overall process of FIG. 3.

Referring to FIG. 4, in order to compute the plane equation vector $n_l$, it is necessary to map points in the masked images $M_{kl}$, derived as previously discussed (step 400), onto the plane $n_l^T X=0$. If X is a 3D world coordinate of a point and $u_k$ is the image of X in camera $P_k$:

$$u_k = P_k X \qquad (1)$$

where equality is in the 2D projective space $\rho^2$. Since $P_k$ is of rank 3, it can be written:

$$X = P_k^* u_k + s p_k \qquad (2)$$

where $P_k^* = P_k^T (P_k P_k^T)^{-1}$ is the pseudoinverse of $P_k$, s is an unknown scalar, and $p_k$ is a vector in the null space of $P_k$, i.e. $P_k p_k = 0$. If X lies on the plane $n_l^T X=0$ then:

$$n_l^T P_k^* u_k + s n_l^T p_k = 0 \qquad (3)$$

Solving this equation for $s_2$ substituting into Equation (2), and rearranging using the fact that equality is up to a scale factor in $\rho^2$, yields:

$$X = ((n_l^T p_k)I - p_k n_l^T) P_k^* u_k \qquad (4)$$

The importance of Equation (4) is that it facilitates the mapping of a point $u_k$ in image $M_{kl}$ onto the point on plane $n_l^T X=0$, of which it is an image. Afterwards this point is mapped onto its image in another camera $P_{k'}$:

$$u_{k'} = P_{k'}((n_l^T p_k) I - p_k n_l^T) P_k^* u_k = H^l_{kk'} u_k \qquad (5)$$

where $H^l_{kk'}$ is a homography (collineation of $\rho^2$) Equation (5) describes the image coordinate warp between the two images $M_{kl}$ and $M_{k'l}$, which would hold if all the masked image pixels were images of world points on the plane $n_l^T X=0$. Using this relation, all of the masked images can be warped onto the coordinate frame of one distinguished image, $M_{1l}$ (step 402), without loss of generality, as follows:

$$(H^l_{1k} \circ M_{kl})(u_l) = M_{kl}(H^l_{1k} u_1) \qquad (6)$$

Here, $H^l_{1k} \circ M_{kl}$ is the masked image $M_{kl}$, warped into the coordinate frame of $M_{1l}$.

It should be noted that it would also be possible to add an extra 2D perspective coordinate transformation in the just-described method (not shown in FIG. 4). Suppose H is an arbitrary homography. Each masked image could be warped onto $H \circ H^l_{1k} \circ M_{kl}(u_l) = M_{kl}(HH^l_{1k} u_1)$. The addition of the homography H can be used to remove the dependence of the above on one distinguished image. For example, H could be chosen to optimize some function of the homographies $HH^l_{1k}$ which measures how close they are to identity.

The property used to compute $n_l$ is the following: assuming the pixel assignments to layers $B_{kl}$ are correct, the world is piecewise planar, and the surfaces are Lambertian, the warped images $H^l_{1k} \circ M_{kl}$ should agree with each other and with $M_{1l}$ where they overlap. There are a number of functions which could possibly be used to measure the degree of consistency between the warped images (step 404), including least squares measures [BAHH92] and robust measures [DP95, SA96]. In both cases, the goal is the same, find the plane equation vector $n_l$ which maximizes the degree of consistency (step 406), which is usually a numerical minimum. Typically, this extremum is found using some form of gradient decent, such as the Gauss-Newton method, and the optimization is performed in a hierarchical (i.e. pyramid based) fashion to avoid local extrema. To apply this standard approach, simply derive the Jacobian of the image warp $H^l_{1k}$ with respect to the parameters of $n_l$ as described in reference [SS98]. This can be computed in a straightforward manner from Equation (5) because the camera matrices $P_k$ are assumed to be known. It is noted that the plane defined by $n_l$ can turn out to be of any orientation and need not be a frontal plane.

1.3 Estimation of Layer Sprites Images

Figure 5:
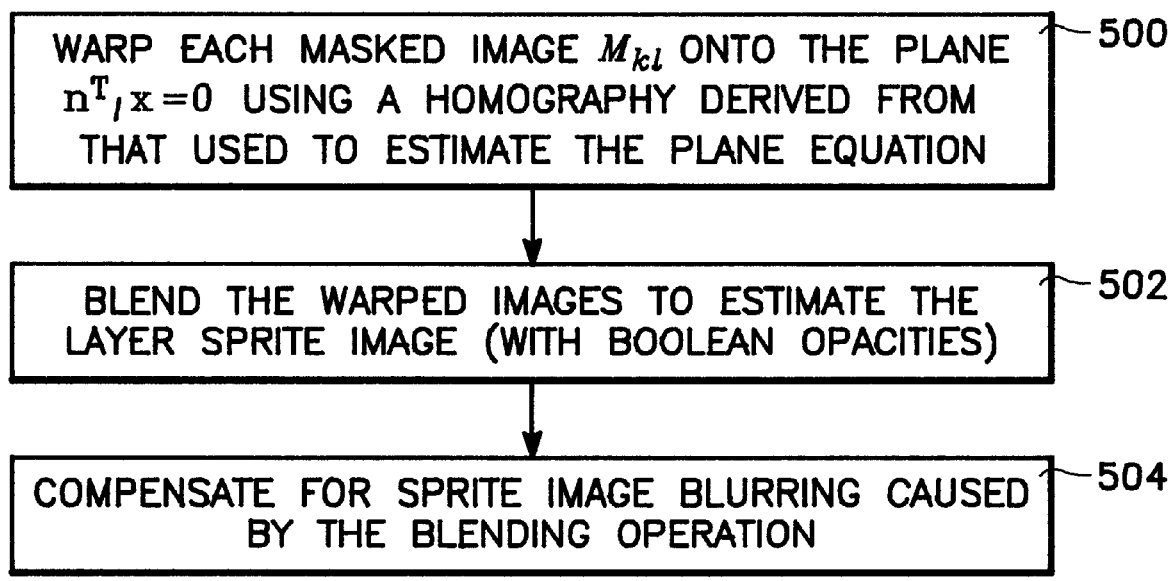
FIG. 5 is a block diagram of a process for accomplishing the layer sprite image estimation module of the overall process of FIG. 3.

Referring to FIG. 5, before the layer sprite images $L_l$ can be computed, 2D coordinate systems must be chosen for the planes. Such coordinate systems can be specified by a collection of arbitrary (rank 3) camera matrices $Q_l$. An interesting choice for $Q_l$ is one for which the null space of $Q_l$ is perpendicular to the plane, and for which the pseudo-inverse maps the coordinate axes onto perpendicular vectors in the plane (i.e., a camera for which the plane is a frontal image plane). However, it is often undesirable to use a fronto-parallel camera since this may unnecessarily warp the input images.

Once $Q_l$ has been specified, it can be shown, by the same argument used in Equations (4) and (5), that the image coordinates $u_l$ of the point in image $M_{kl}$ which is projected onto the point $u_l$ on the plane $n_l^T X=0$ is given by:

$$u_k = P_k ((n_l^T q_l) I - q_l n_l^T) Q_l^* u_l = H^l_k u_k \qquad (7)$$

where $Q_l^*$ is the pseudo-inverse of $Q_l$ and $q_l$ is a vector in the null space of $Q_l$. The homography $H^l_k$ warps the coordinate frame of the plane backward onto that of image $M_{kl}$. The homography can also be used to warp the image $M_{kl}$ forward onto the plane (step 500), the result of which is denoted $H^l_k \circ M_{kl}$. After the masked image has been warped onto the plane, the layer sprite image (with boolean opacities) can be estimated by "blending" the warped images:

$$L_l = \bigoplus_{k=1}^{K} H^l_k \circ M_{kl} \qquad (8)$$

where $\oplus$ is the blending operator (step 502).

There are a number of ways the blending could be performed. One simple method would be to take the mean of the color or intensity values. A refinement would be to use a "feathering" algorithm, where the averaging is weighted by the distance of each pixel from the nearest invisible pixel in $M_{kl}$, as used in reference [SS97]. Alternately, robust techniques could be used to estimate $L_l$ from the warped images. The simplest example of such a technique is the median, but many others exist.

There is a possibility that the images $I_k$ could have different exposure characteristics owing to differences in the cameras used to capture the images or differences in the camera settings between images if the same camera was used to take the disparate images. The difference in the exposure between images will skew the colors and opacities exhibited by corresponding image points. One possibility for addressing this exposure problem is to simply ignore it. The previously-described blending operation will tend to smooth out the disparities between the images. In some applications, this smoothing will produce sprite images reasonably close to the actual layer sprite image. However, if proactive measures are needed to ensure the sprite images exhibit an acceptable resolution, it is possible to monitor the bias and gain characteristics of the camera or cameras, and subject the images to a correction procedure to compensate for any disparity between the camera characteristics.

Such corrective procedures are well known and so will not be described in detail in this specification. Once the images have been corrected, the blending process can proceed as described above.

One unfortunate effect of the blending in Equation (8) is that most forms of averaging tend to increase image blur, particularly when there are a large number of images. Part of the cause is non-planarity in the scene (which will be modeled in the next section), however image noise and resampling error also contribute. Therefore, this blurring effect should be compensated for (step 504) before proceeding to the residual depth estimation module. One simple method of compensating for this effect is to "deghost'" the sprite images as described in reference [SS98]. Another solution is to explicitly use an image enhancement technique such as one of those described in references [IP92, MP94, CB97].

These latter techniques have the added advantage of estimating a sprite with greater resolution than that of the input images.

1.4 Estimation of Residual Depth

Figure 6:
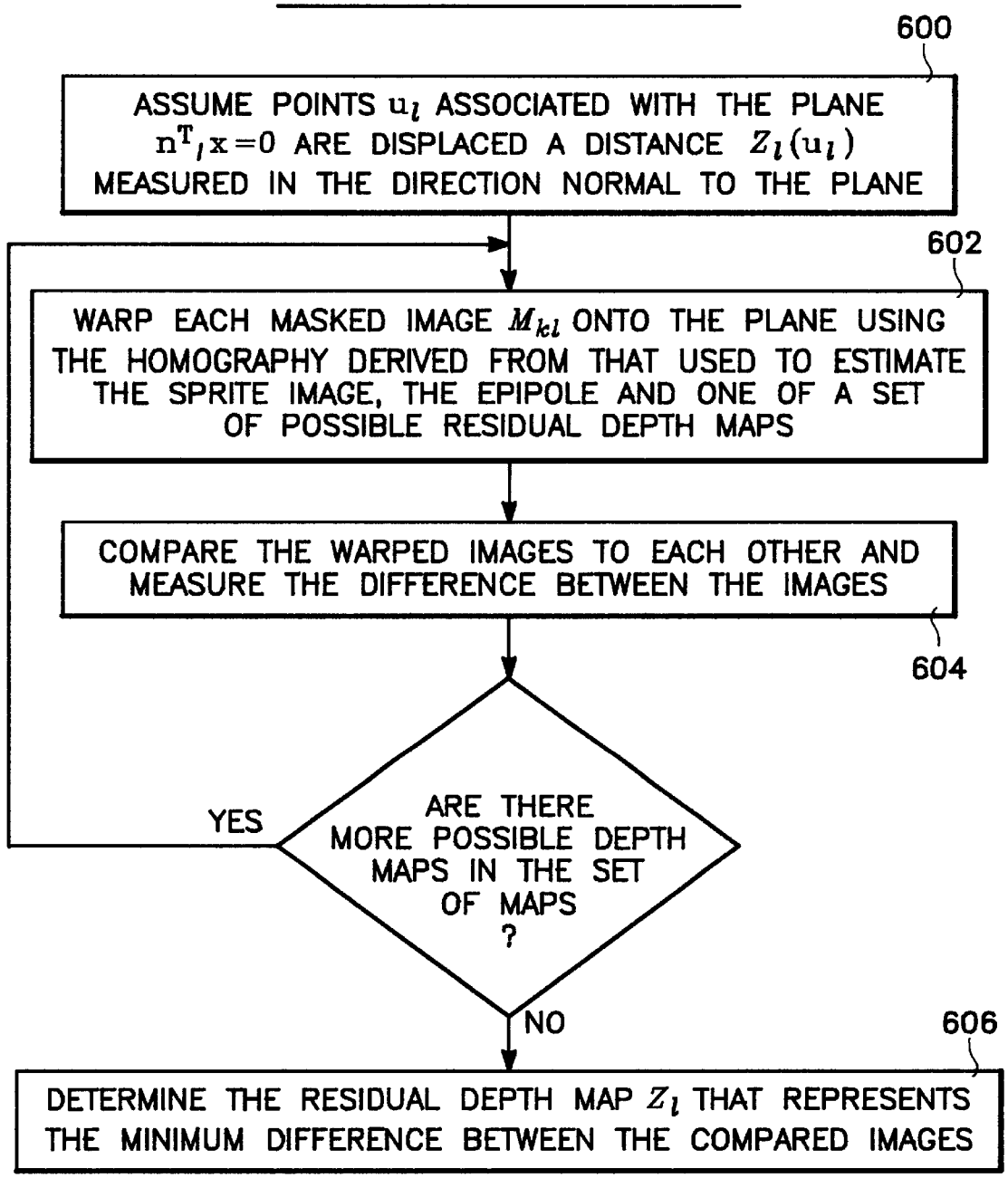
FIG. 6 is a block diagram of a process for accomplishing the residual depth map estimation module of the overall process of FIG. 3.

In general, the scene will not be exactly piecewise planar. To model any non-planarity, it can be assumed that the point $u_l$ on the plane $n_l^T X=0$ is displaced slightly. Referring to FIG. 6, it will be assumed the point is displaced in the direction of the ray through $u_l$ defined by the camera matrix $Q_l$, and that the distance it is displaced is $Z_l(u_l)$, measured in the direction normal to the plane (step 600). In this case, the homographic warps used previously are not applicable. However, using a similar argument to that in Section 1.2 and 1.3, it can be shown (see also [KAH94, DTM96]) that:

$$u_k = H^l_k u_l + Z_l(u_l) t_{kl} \quad (9)$$

where $H^l_k = P_k((n_l^T q_l)I - q_l n_l^T)Q_l^*$ is the planar homography of Section 1.3, $t_{kl} = P_k q_l$ is the epipole, and it is assumed that the plane equation vector $n_l = (n_x, n_y, n_z, n_d)^T$ has been normalized so that $n_x^2 + n_y^2 + n_z^2 = 1$. Equation (9) can be used to map plane coordinates $u_l$ backwards to image coordinates $u_k$, or to map the image $M_{kl}$ forwards onto the plane (step 602). The result of this warp is denoted by $(H^l_k, t_{kl}, Z_l) \circ M_{kl}$, or $W^l_k \circ M_{kl}$ for more concise notation.

To compute the residual depth map $Z_l$, an optimization of the same (or a similar) consistency metric as that used in Section 1.2 to estimate the plane equation could be employed (steps 604 and 606). Doing so is essentially solving a simpler stereo problem. In fact, almost any stereo algorithm could be used to compute $Z_l$. The one property the algorithm should have is that it favors small disparities.

1.5 Re-Estimation of Layer Sprite Images

Once the residual depth offsets have been estimated, the layer sprite images should be re-estimated using:

$$L_l = \bigoplus_{k=1}^{K} (H^l_k, t_{kl}, Z_l) \circ M_{kl} = \bigoplus_{k=1}^{K} W^l_k \circ M_{kl} \quad (10)$$

rather than Equation (8). This re-estimation of the layer sprite images using the just computed residual depth offsets provides a more accurate representation of the per-pixel color values of each sprite image. When the images $I_k$ are warped onto the estimated plane of a layer, points actually on the plane will register exactly. However, corresponding image points in the images that are offset from the estimated plane will warp onto the plane in different locations, thereby reducing the accuracy of the blended layer sprite image. Thus, re-estimating the layer sprite images by first compensating for the parallax effect between points offset from the estimated plane and so bringing these points into alignment in the warped images, will increase the resolution of the layer sprite image estimates. Equation (10) accomplishes this alignment and blending process.

1.6 Re-Assignment of Pixels to Layers

The initial assignments of pixels to a particular layer were made using one of the methods previously described in section 1.1. However, the initial assignment process represented a somewhat crude estimate of what layer each pixel should belong and was done simply to provide a starting point for estimating the plane equations, sprite images and residual depths (i.e., $n_l$, $L_l$ and $Z_l$, respectively). The Boolean masks $B_{kl}$ contain this initial assignment information and allowed the computation of the masked image $M_{kl}$ using $M_{kl} = B_{kl} \cdot I_k$. It will now be described how to re-estimate the pixel assignments from the estimates of $n_l$, $L_l$ and $Z_l$ to obtain a more accurate grouping of the pixels to the various layers.

Figure 7:
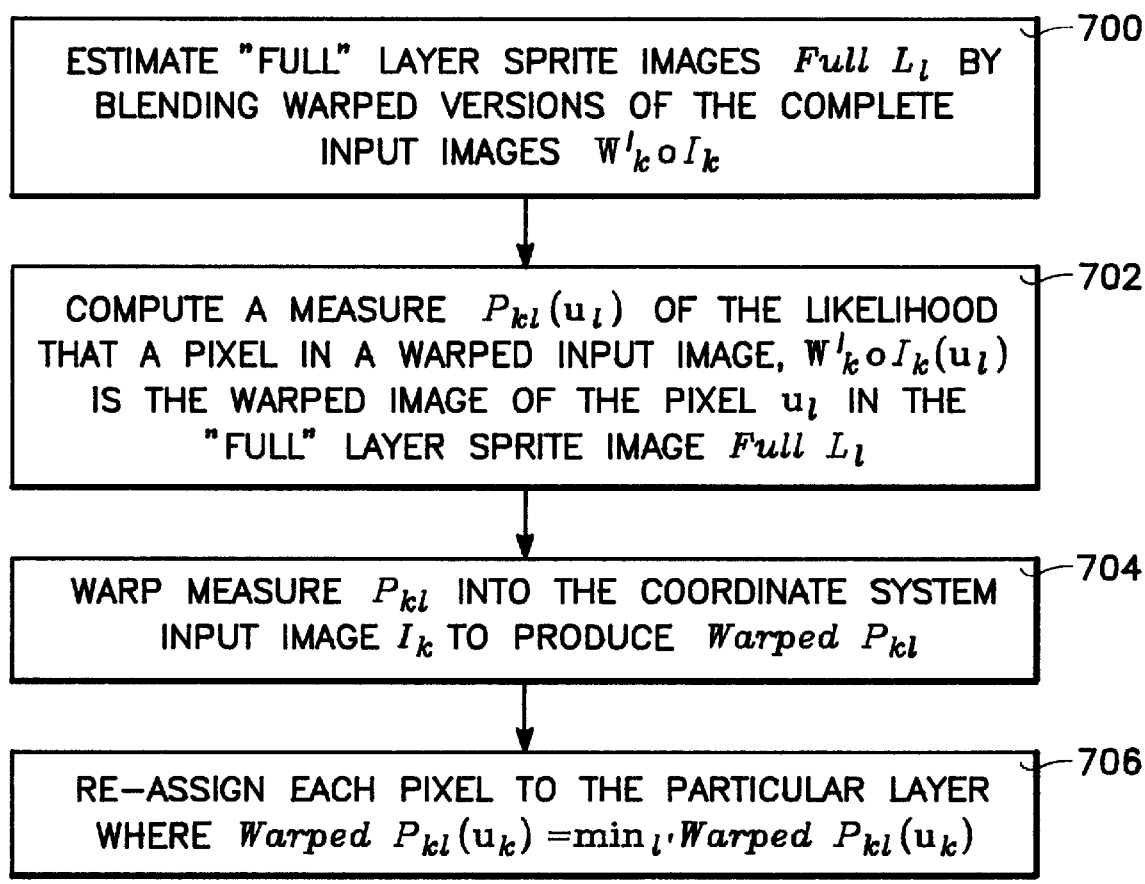
FIG. 7 is a block diagram of a process for accomplishing the pixel reassignment module of the overall process of FIG. 3.

One possible method would be to update the pixel assignments by comparing the warped images $W^l_k \circ M_{kl}$ to the layer sprite images $L_l$. However, if these images were compared, it would not be possible to deduce anything about the pixel assignments outside of the current estimates of the masked regions. Thus, it is preferable to make the Boolean mask $B_{kl}$ "grow", thereby allowing for pixel assignments outside the current estimated masked regions to be considered. Referring to FIG. 7, the Boolean mask $B_{kl}$ is allowed to "grow" by comparing $W^l_k \circ I_k$ with:

$$\text{Full } L_l = \bigoplus_{k=1}^{K} W^l_k \circ I_k \quad (11)$$

where $Z_l$ is enlarged so that it declines to zero outside the masked region (step 700). The danger with working with warped versions of the complete input images $W^l_k \circ I_k$ is that unoccluded pixels will be blended together with occluded pixels and result in poor estimates of the "full" layer sprites Full $L_l$. One possible solution to this is a use of a robust blending operator, such as the median. Another solution might be to weight masked pixels more than unmasked pixels during the blend. A final possibility would be to grow the current estimate of $B_{kl}$ by a small prescribed number of pixels (e.g., 5 pixels), and then recompute $W^l_k \circ M_{kl}$. Such a strategy would still allow the layer masks to grow slightly on each iteration, but, it is believed, limit the influence of occluded pixels in the blend.

Given the full layer sprites Full $L_l$, a preferred approach to pixel re-assignment is as follows. First compute a measure $P_{kl}(u_l)$ of the likelihood that the pixel $W^l_k \circ I_k(u_l)$ is the warped image of the pixel $u_l$ in the full layer sprite Full $L_l$ (step 702). Next, $P_{kl}$ is warped back into the coordinate system of the input image $I_k$ (step 704) to yield:

$$\text{Warped } P_{kl} = (W^l_k)^{-1} \circ P_{kl} \tag{12}$$

This warping tends to blur $P_{kl}$, but the blurring is believed to be acceptable since it is desired to smooth the pixel assignment anyway. In fact, it may be advantageous to smooth $P_{kl}$ even more by, for example, using an isotropic smoother such as a Gaussian. Other, more directed, smoothing methods could include performing a color segmentation of each input image and only smoothing within each segment as described in [ASB94]. Alternatively, $P_{kl}$ might be smoothed less in the direction of the intensity gradient since strong gradients often coincide with depth discontinuities and hence layer boundaries. These latter two methods may produce a better result as it is believed they would tend to smooth $P_{kl}$ where it is most needed, rather than in a general fashion as would be the case with the aforementioned Gaussian smoothing procedure.

The pixel re-assignment can now be computed by choosing the best possible layer for each pixel (step 706):

$$B_{kl}(u_k) = \begin{cases} 1 & \text{if Warped } P_{kl}(u_k) = \min_{l'} \text{Warped } P_{kl'}(u_k) \\ 0 & \text{otherwise} \end{cases} \tag{13}$$

There are a number of possible ways of defining $P_{kl}$. Perhaps the simplest is the residual intensity difference [SA96]:

$$P_{kl} = \|W^l_k \circ I_k \text{-Full } L_l\| \tag{14}$$

Another possibility is the residual normal flow magnitude:

$$P_{kl} = \frac{\|W^l_k \circ I_k - Full\ L_l\|}{\|\nabla\ Full\ L_l\|} \tag{15}$$

Locally estimated variants of the residual normal flow have been described in [IP92, IRP92, IAH95]. A third possibility would be to compute the optical flow between $W^l_k \circ I_k$ and Full $L_l$ and then use the magnitude of the flow for $P_{kl}$.

Once the pixel re-assignment process is complete and updated Boolean masks $B_{kl}$ have been computed via equation (13), the estimation steps described in sections 1.2 through 1.6 can be iteratively repeated until the change from one iteration to the next fall below a prescribed threshold. This prescribed threshold can relate to one or any combination of the layer parameters $n_l$, $L_l$, $Z_l$ and $B_{kl}$. For example, if the change in the Boolean mask image $B_{kl}$ from the immediately preceding iteration falls below a certain percentage change threshold, it might be assumed that the then current estimates for the other parameters (i.e., $n_l$, $L_l$, and $Z_l$) are as accurate as possible for the initial estimation phase of the stereo reconstruction process. Alternately, one of the other layer parameters, or a combination of any or all of the parameters could be put to a similar threshold test. In these alternate methods, if the change between iterations in some number or all the tested parameters falls below their associated prescribed thresholds, then the iterative process would be stopped and the then current layer parameters accepted as the final estimate for the initial phase of the process. The actual threshold or thresholds employed will depend on the application and the degree of accuracy required. The number and value of the threshold(s) can be readily determined given the resolution desired for the particular application in which the present invention is being employed, and so will not be elaborated upon herein.

2. ALTERNATE EMBODIMENTS

The foregoing estimation process for extracting 3D structure from stereo images was described as including all the program modules depicted in FIG. 3.

Although it is believed the full process will provide the best estimation of the layer parameters $L_l$, $n_l$ and $Z_l$, many applications may not require the high degree of accuracy afforded by the full process. For such applications, some of the modules could be eliminated and still provide the called for resolution. For example, the stereo reconstruction process according to the present invention could be pared down to a five step process involving just the Input, Initializing, Plane Equation Estimation, Layer Sprite Image Estimation and Output modules. In the minimal process, the output would consist of only the plane equation $n_l$ and the layer sprite image $L_l$. All the other modules depicted in FIG. 3 would be optional. For instance, if a better resolution were required, the Residual Depth Estimation module could be added, thereby including the residual depth parameter $Z_l$ as part of the output. Similarly, the Layer Sprite Image Re-Estimation and/or the Pixel Re-Assignment modules could be added to improve the accuracy of the initial layer parameter estimates. Thus, it is believed the present stereo reconstruction approach can provide considerable flexibility in it implementation and can be readily tailored to produce the desired output resolution with the minimum of processing steps.

3. TESTED EMBODIMENTS

A stereo reconstruction program embodying many of the aspects of the present invention was coded in visual C++and run on a conventional PC. The program in its coded form is storable on and can be executed from any appropriate storage medium, such as the hard disk, magnetic disk 29, optical disk 31, ROM 24 or RAM 25 discussed in connection with FIG. 1. The process was applied to a number of multi-frame stereo data set images, two of which are detailed below. The particular data sets used in the present examples were standard motion sequences with no independently moving objects.

To initialize the stereo reconstruction process, we specified the number of layers and performed a rough assignment of pixels to these layers by hand. Next, an automatic hierarchical parametric motion estimation algorithm similar to that described in [BAHH92] was used to find the homographies between the layers, as defined in Equation (7). We set $Q_l=P_l$ such that the layers are reconstructed in the coordinate system of the first camera. Using these homographies, we found the best plane estimate for each layer using a Euclidean structure from motion algorithm described in reference [VZR96].

The results of applying these steps to the MPEG flower garden sequence are shown in FIGS. 8(*a*)–(*h*). FIGS. 8(*a*) and (*b*) show the first and last image in the subsequence we used (the first seven even images). FIG. 8(*c*) shows the initial pixel labeling into seven layers. FIGS. 8(*d*) and (*e*) show the sprite images corresponding to each of the seven layers, re-arranged for more compact display. (These sprite images are the ones re-computed after the residual depth estimation step.) Note that the sprite image for the lower flower bed appears in two pieces because it is occluded by the tree trunk. Also note that because of the compositing and blending that takes place during sprite construction, each sprite is larger than its footprint in any one of the input images. This sprite representation makes it very easy to re-synthesize novel images without leaving gaps in the new image. FIG. 8(f) shows the depth map computed by painting every pixel in every sprite with a corresponding color coded Z value, and then re-compositing the image. The depth discontinuities are much crisper and cleaner than those available with traditional stereo correspondence algorithms.

Figure 8A:
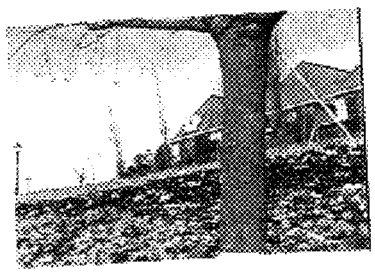
FIGS. 8(a)–(h) are images depicting the results of various stages of the overall process of FIG. 3 as applied to a scene of a flower garden.
Figure 8B:
Figure 8C:
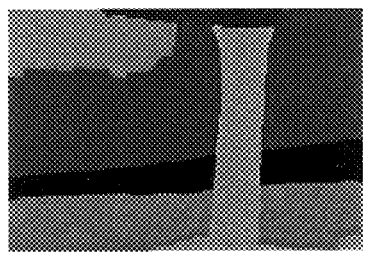
Figure 8D:
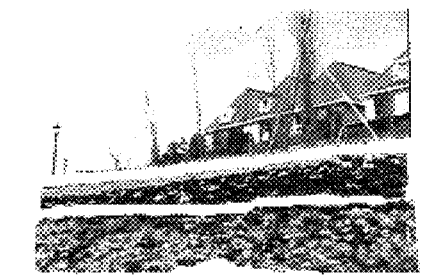
Figure 8E:
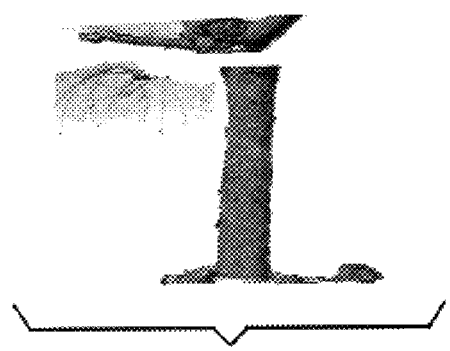
Figure 8F:
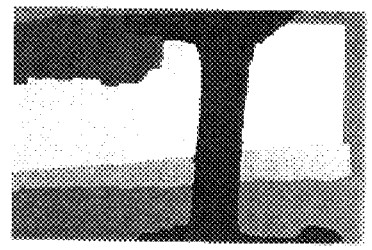
Figure 8G:
Figure 8H:

Once we have recovered the initial geometric structure, we recomputed the homographies directly from the plane equations. We then ran a traditional stereo matching algorithm to estimate the residual depths $Z_l$, within each layer, without worrying about occlusions or large disparities. After the residual depths had been estimated, we re-computed the color pixel values in each layer. Since the correspondence is now much better across images, the resulting sprites images are much less blurry. FIG. 8(g) shows the original sprite image obtained for the lower flower bed, while FIG. 8(h) shows the sprite after residual depth estimation.

Figure 9A:
FIGS. 9(a)–(f) are images depicting the results of various stages of the overall process of FIG. 3 as applied to a scene of a computer graphics symposium.
Figure 9B:
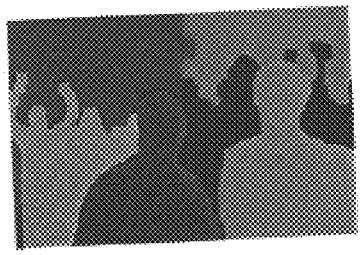
Figure 9C:
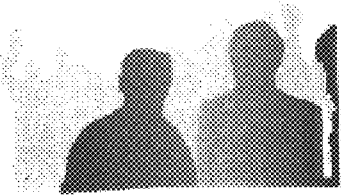
Figure 9D:
Figure 9E:
Figure 9F:

Our second set of experiments uses five images taken from a 40-image stereo dataset taken at a computer graphics symposium. FIG. 9(a) shows the middle input image, FIG. 9(b) shows the initial pixel assignment to layers, and FIG. 9(c) shows the recovered depth map. FIGS. 9(d) and (e) show the recovered sprites, and FIG. 9(f) shows the middle image re-synthesized from these sprites. The gaps visible in FIGS. 9(c) and 9(f) lie outside the area corresponding to the middle image, where the appropriate parts of the background sprites could not be seen.

While the invention has been described in detail by specific reference to preferred embodiments, it is understood that variations and modifications thereof may be made without departing from the true spirit and scope of the invention. For example, it has been assumed to this point that the camera matrices $P_k$ are known a priori. In Section 1.2, this knowledge was taken advantage of to perform a single optimization over the 3 parameters of the plane $n_l^T X = 0$. Since each homography $H^l_{1k}$ is only a function of $n_l$, all K masked input images $M_{kl}$ can be aligned using just one 3-parameter optimization. However, if the camera matrices are not known, there are 8(K−1) parameters (i.e. since $H^l_{11}=I$, there are K−1 unknown homographies, each of which has 8 parameters). When the camera matrices are not known, it is still possible to align the K masked images $M_{kl}$ (i.e. compute the homographies $H^l_{1k}$) by optimizing the same measure of consistency over these 8(K−1) parameters. There are several ways to do this. One is to perform one large optimization. Another is to perform K−1 alignments in sequence, each aligning a new image to the blend of the previous ones [SS98]. Alternately, the sequential approach could be used to initialize the global optimization [SS98].

Once the homographies $H^l_{1k}$ have been determined, it is then possible to compute the camera matrices $P_k$ assuming the intrinsic calibration of the cameras is known, as described in [FL88]. If the cameras are not calibrated, all that can be computed is the fundamental matrices [LF93].

The fact the camera matrices can be computed from a collection of homographies means that, when the epipolar geometry is not known a priori, the estimation of the plane equations in Section 1.2 can be split into three smaller steps: (a) compute the homographies, (b) compute the camera matrices from the homographies, and then (c) compute the plane equations in the same way as in Section 1.2.

It is noted in circumstances where the camera matrices are not known, a good choice for $Q_l$ in Equation (7) in Section 1.3 would be one of the camera matrices $P_k$. Then, Equation (7) reduces to the same form as Equation (5). This is a natural choice when working with unknown camera geometry and hence an unknown $n_l$.

REFERENCES

[ASB94] S. Ayer, P. Schroeter, and J. Bigün. Segmentation of moving objects by robust parameter estimation over multiple frames. In *3rd ECCV*, pages 316–327, 1994.

[BAHH92] J. R. Bergen, P Anandan, K. J. Hanna, and R. Hingorani. Hierarchical model-based motion estimation. In *2nd ECCV*, pages 237–252, 1992.

[BJ96] M. J. Black and A. D. Jepson. Estimating optical flow in segmented images using variable-order parametric models with local deformations. *PAMI*, 18(10):972–986, 1996.

[CB97] M. C. Chiang and T. E. Boult. Local blur estimation and super-resolution. In *CVPR '97*, pages 821–826, 1997.

[DP95] T. Darrell and A. P. Pentland. Cooperative robust estimation using layers of support. *PAMI*, 17(5):474–487, 1995.

[DTM96] P.E. Debevec, C. J. Taylor, and J. Malik. Modeling and rendering architecture from photographs: A hybrid geometry and image-based approach. In *SIGGRAPH '96*, pages 11–20, 1996.

[FL88] O. D. Faugeras and F. Lustman. Motion and structure from motion in a piecewise planar environment. *International Journal of Pattern Recognition and Artificial Intelligence*, 2(3):485–509, 1988.

[IAH95] M. Irani, P. Anandan, and S. Hsu. Mosaic based representations of video sequences and their applications. In *5th ICCV*, pages 605–611, 1995.

[IP92] M. Irani and S. Peleg. Image sequence enhancement using multiple motions analysis. In *CVPR '92*, pages 216–221, 1992.

[IRP92] M. Irani, B. Rousso, and S. Peleg. Detecting and tracking multiple moving objects using temporal integration. In *2nd ECCV*, pages 282–287, 1992.

[KAH94] R. Kumar, P. Anandan, and K. Hanna. Direct recovery of shape from multiple views: A parallax based approach. In *12th ICPR*, pages 685–688, 1994.

[LF93] Q. -T. Luong and O. Faugeras. Determining the fundamental matrix with planes: Instability and new algorithms. In *CVPR '93*, pages 489–494, 1993.

[MP94] S. Mann and R. W. Picard. Virtual bellows: Constructing high quality stills from video. In *1st ICIP*, pages 363–367, 1994.

[SA96] H. S. Sawhney and S. Ayer. Compact representations for videos through dominant and multiple motion estimation. *PAMI*, 18(8):814–830, 1996.

[SS97] R. Szeliski and H. -Y. Shum. Creating full view panoramic image mosaics and texture-mapped models. In *SIGGRAPH '97*, pages 251–258, 1997

[SS98] H. -Y. Shum and R. Szeliski. Construction and refinement of panoramic mosaics with global & local alignment. In *ICCV '98*, pages 953–958, 1998.

[VZR96] T. Viéville, C. Zeller, and L. Robert. Using collineations to compute motion and structure in an uncalibrated image sequence. *IJCV*, 20(3): 213–242, 1996.

[WA93] J. Y. A. Wang and E. H. Adelson. Layered representation for motion analysis. In *CVPR '93*, pages 361–366,1993.

What is claimed is:

1. A computer implemented process to extract 3D structure from plural, stereo, 2D images of a scene, comprising using a computer to perform the following steps:

creating from the 2D images a representation of the scene comprising plural layers, each of which is characterized by at least its orientation and position, per-pixel color, per-pixel opacity, and a per-pixel depth defining the distance each pixel associated with the layer is offset from that layer, whereby the layers define the 3D structure of the scene.

2. The process of claim 1, wherein the step of creating the plural layers comprises:

inputting the plural 2D images as well as camera projection matrices defining the location and orientation of a camera responsible for creating each image respectively;

assigning each pixel making up each 2D image to one of the plural layers;

estimating a plane equation for each layer that defines the orientation and position of that layer in 3D space;

estimating a sprite image for each layer wherein each of the sprite images is defined by a per-pixel color and a per-pixel opacity; and outputting data representative of the plane equation and sprite image estimates for each layer.

3. The process of claim 2, wherein the opacity of each pixel of each sprite image is characterized in Boolean terms.

4. The process of claim 2, wherein the step of estimating the plane equation for each layer comprises:

defining masked images for the layer, wherein each masked image respectively corresponds to a one of the input images and comprises all the pixels assigned to the layer from its corresponding input image;

warping each of the masked images onto a distinguished image, using a homography derived from a camera projection matrix of the camera responsible for creating the masked image being warped and one of a set of possible plane equations, to create a set of warped images, wherein the distinguished image constitutes the masked image corresponding to a prescribe one of the input images;

comparing each of the set of warped images to each other and the distinguished image to determine a degree of difference between the images;

repeating the warping and comparing steps using another of the possible plane equations; and estimating a plane equation for the layer as that which produces the minimum degree of difference between each of the set of warped images and between each of the set of warped images and the distinguished image.

5. The process of claim 4, wherein the step of estimating the sprite image for each layer comprises:

warping each masked image onto a plane $n_l^T X=0$ using a homography derived from the homography employed to estimate the plane equation to create a set of warped images;

blending the set of warped images together; and compensating for blurring caused by the blending step.

6. The process of claim 2, wherein the camera projection matrices are known and input by a user.

7. The process of claim 2, wherein the camera projection matrices are unknown and computed prior to being input.

8. The process of claim 1, wherein the step of creating the plural layers comprises:

inputting the plural 2D images as well as camera projection matrices defining the location and orientation of a camera responsible for creating each image respectively;

assigning each pixel making up each 2D image to one of the plural layers;

estimating a plane equation for each layer that defines the orientation and position of that layer in 3D space;

estimating a sprite image for each layer wherein each of the sprite images is defined by a per-pixel color and a per-pixel opacity;

estimating a residual depth map for each layer wherein each residual depth map defines the distance each pixel of the associated layer is offset from the estimated plane of that layer;

outputting data representative of the plane equation, sprite image and residual depth map estimates for each layer.

9. The process of claim 8, wherein the opacity of each pixel of each sprite image is characterized in Boolean terms.

10. The process of claim 8, wherein the step of estimating a plane equation for each layer comprises:

defining masked images for the layer, wherein each masked image respectively corresponds to a one of the input images and comprises all the pixels assigned to the layer from its corresponding input image;

warping each of the masked images onto a distinguished image, using a homography derived from a camera projection matrix of the camera responsible for creating the masked image being warped and one of a set of possible plane equations, to create a set of warped images, wherein the distinguished image constitutes the masked image corresponding to a prescribe one of the input images;

comparing each of the set of warped images to each other and the distinguished image to determine a degree of difference between the images;

repeating the warping and comparing steps using another of the possible plane equations; and estimating a plane equation for the layer as that which produces the minimum degree of difference between each of the set of warped images and between each of the set of warped images and the distinguished image.

11. The process of claim 10, wherein the step of estimating the sprite image for each layer comprises:

warping each masked image onto a plane $n_l^T X=0$ using a homography derived from the homography employed to estimate the plane equation to create a set of warped images;

blending the set of warped images together; and compensating for blurring caused by the blending step.

12. The process of claim 11, wherein the step of estimating the residual depth map for each layer comprises:

warping each masked image onto a plane $n_l^T X=0$ using a relationship based on the homography employed to estimate the sprite image for the layer, an epipole and one of a set of possible residual depth maps, to create a set of warped images;

comparing each of the set of warped images to each other to determine a degree of difference between the images;

repeating the warping and comparing steps using another of the possible residual depth maps; and estimating a residual depth map for the layer that will produce the minimum degree of difference between each of the set of warped images.

13. The process of claim 8, wherein the step of creating the plural layers further comprises re-estimating each layer's sprite image based on the residual depth map associated with that layer.

14. The process of claim 12, wherein the step of creating the plural layers further comprises re-estimating each layer's sprite image based on the residual depth map associated with that layer, said step of re-estimating the layer's sprite image comprising:

warping each masked image onto a plane $n_l^T X=0$ using a relationship based on the homography employed to estimate the sprite image for the layer, the epipole and the estimated residual depth map of the layer to create a set of warped images; and blending the set of warped images together to create a re-estimated layer sprite image.

15. The process of claim 8, wherein the camera projection matrices are known and input by a user.

16. The process of claim 8, wherein the camera projection matrices are unknown and computed prior to being input.

17. The process of claim 1, wherein the step of creating the plural layers comprises:

(a) inputting the plural 2D images as well as camera projection matrices defining the location and orientation of a camera responsible for creating each image respectively;

(b) assigning each pixel making up each 2D image to one of the plural layers;

(c) estimating a plane equation for each layer that defines the orientation and position of that layer in 3D space;

(d) estimating a sprite image for each layer wherein each of the sprite images is defined by a per-pixel color and a per-pixel opacity;

(e) estimating a residual depth map for each layer wherein each residual depth map defines the distance each pixel of the associated layer is offset from the estimated plane of that layer;

(f) re-assigning pixels assigned to a particular layer to another layer by using the estimates for the plane equation, sprite image, and residual depth map for each layer as a guide;

(g) iteratively repeating steps (c) through (f) for each layer until the change in the value of at least one layer parameter relative to its value in an immediately preceding iteration falls below a prescribed threshold assigned to the parameter, wherein the change in the at least one layer parameter between iterations is indicative of the accuracy of the estimates for the plane equation, sprite image and residual depth map associated the layer; and (h) outputting data representative of the plane equation, sprite image and residual depth map estimates for each layer.

18. The process of claim 17, wherein step (g) comprises iteratively repeating steps (c) through (f) for each layer until a change in the number of pixels re-assigned to and from the layer, relative to the number of pixels re-assigned to and from the layer in the immediately preceding iteration, falls below a percentage change threshold.

19. The process of claim 17, wherein step (g) comprises iteratively repeating steps (c) through (f) for each layer until a change in the estimate of at least one of the plane equation, sprite image and residual depth map associated the layer, relative to the corresponding estimate in the immediately preceding iteration, falls below a threshold prescribed for the change.

20. The process of claim 17, wherein step (g) comprises iteratively repeating steps (c) through (f) for each layer until:

a change in the number of pixels re-assigned to and from the layer, relative to the number of pixels re-assigned to and from the layer in the immediately preceding iteration, falls below a percentage change threshold; and a change in the estimate of at least one of the plane equation, sprite image and residual depth map associated the layer, relative to the corresponding estimate in the immediately preceding iteration, falls below a threshold prescribed for the change.

21. The process of claim 17, wherein the opacity of each pixel of each sprite image is characterized in Boolean terms.

22. The process of claim 17, wherein the step of estimating the plane equation for each layer comprises:

defining masked images for the layer, wherein each masked image respectively corresponds to a one of the input images and comprises all the pixels assigned to the layer from its corresponding input image;

warping each of the masked images onto a distinguished image, using a nomography derived from a camera projection matrix of the camera responsible for creating the masked image being warped and one of a set of possible plane equations, to create a set of warped images, wherein the distinguished image constitutes the masked image corresponding to a prescribe one of the input images;

comparing each of the set of warped images to each other and the distinguished image to determine a degree of difference between the images;

repeating the warping and comparing steps using another of the possible plane equations; and estimating a plane equation for the layer as that which produces the minimum degree of difference between each of the set of warped images and between each of the set of warped images and the distinguished image.

23. The process of claim 22, wherein the step of estimating the sprite image for each layer comprises:

warping each masked image onto a plane $n_l^T X=0$ using a homography derived from the homography employed to estimate the plane equation to create a set of warped images;

blending the set of warped images together; and compensating for blurring caused by the blending step.

24. The process of claim 23, wherein the step of estimating the residual depth map for each layer comprises:

warping each masked image onto a plane $n_l^T X=0$ using a relationship based on the homography employed to estimate the sprite image for the layer, an epipole and one of a set of possible residual depth maps, to create a set of warped images;

comparing each of the set of warped images to each other to determine a degree of difference between the images;

repeating the warping and comparing steps using another of the possible residual depth maps; and estimating a residual depth map for the layer that will produce the minimum degree of difference between each of the set of warped images.

25. The process of claim 17, wherein the step of creating the plural layers further comprises re-estimating each layer's sprite image based on the residual depth map associated with that layer prior to performing step (f).

26. The process of claim 24, wherein the step of creating the plural layers further comprises re-estimating each layer's sprite image based on the residual depth map associated with that layer prior to performing step (f), the step of re-estimating the layer's sprite image comprising:

warping each masked image onto a plane $n_l^T X=0$ using a relationship based on the homography employed to estimate the sprite image for the layer, the epipole and the estimated residual depth map of the layer to create a set of warped images; and blending the set of warped images together to create a re-estimated layer sprite image.

27. The process of claim 24, wherein the step of re-assigning pixels to and from each layer comprises:
   warping each input image onto a plane $n_l^T X=0$ using a relationship based on the homography employed to estimate the sprite image for the layer, the epipole and the estimated residual depth map of the layer to create a set of warped images;
   blending the set of warped images together to create a full layer sprite image, wherein the full layer sprite image is defined by a per-pixel color and a per-pixel opacity;
   computing a measure for each pixel in each of the set of warped images of the likelihood that the pixel is the warped image of a corresponding pixel in the full layer sprite image;
   warping each computed measure into each input image to create a warped measure for each pixel of each input image; and
   re-assigning each pixel of each input image to a layer wherein the warped measure associated with that pixel indicates the highest likelihood that the pixel is the warped image of the corresponding pixel in the full layer sprite.

28. The process of claim 17, wherein the camera projection matrices are known and input by a user.

29. The process of claim 17, wherein the camera projection matrices are unknown and computed prior to being input.

30. A system for extracting 3D structure from plural, stereo, 2D images of a scene, comprising:
   a general purpose computing device;
   a computer program comprising program modules executable by the computing device, wherein the computing device is directed by the computer program to compute from the 2D images input thereto a representation of the scene comprising plural layers, each of which is characterized by parameters at least including the layer's orientation and position, per-pixel color, per-pixel opacity, and a per-pixel depth defining the distance each pixel associated with the layer is offset from that layer, the computer thereafter outputting the layer parameters to define the 3D structure of the scene.

31. The system of claim 30, wherein the computer program comprises program modules for:
   inputting the plural 2D images as well as camera projection matrices defining the location and orientation of a camera responsible for creating each image respectively;
   assigning each pixel making up each 2D image to one of the plural layers;
   estimating a plane equation for each layer that defines the orientation and position of that layer in 3D space;
   estimating a sprite image for each layer wherein each of the sprite images is defined by a per-pixel color and a per-pixel opacity; and
   outputting data representative of the plane equation and sprite image estimates for each layer.

32. The system of claim 31, wherein the opacity of each pixel of each sprite image is characterized in Boolean terms.

33. The system of claim 31, wherein the program module for estimating the plane equation for each layer comprises sub-modules for:
   defining masked images for the layer, wherein each masked image respectively corresponds to a one of the input images and comprises all the pixels assigned to the layer from its corresponding input image;
   warping each of the masked images onto a distinguished image, using a homography derived from a camera projection matrix of the camera responsible for creating the masked image being warped and one of a set of possible plane equations, to create a set of warped images, wherein the distinguished image constitutes the masked image corresponding to a prescribe one of the input images;
   comparing each of the set of warped images to each other and the distinguished image to determine a degree of difference between the images;
   repeating the warping and comparing steps using another of the possible plane equations; and
   estimating a plane equation for the layer as that which produces the minimum degree of difference between each of the set of warped images and between each of the set of warped images and the distinguished image.

34. The system of claim 33, wherein the program module for estimating the sprite image for each layer comprises sub-modules for:
   warping each masked image onto a plane $n_l^T X=0$ using a homography derived from the homography employed to estimate the plane equation to create a set of warped images;
   blending the set of warped images together; and
   compensating for blurring caused by the blending step.

35. The system of claim 31, wherein the camera projection matrices are known and input by a user.

36. The system of claim 31, wherein the camera projection matrices are unknown and computed prior to being input.

37. The system of claim 30, wherein the computer program comprises program modules for:
   inputting the plural 2D images as well as camera projection matrices defining the location and orientation of a camera responsible for creating each image respectively;
   assigning each pixel making up each 2D image to one of the plural layers;
   estimating a plane equation for each layer that defines the orientation and position of that layer in 3D space;
   estimating a sprite image for each layer wherein each of the sprite images is defined by a per-pixel color and a per-pixel opacity;
   estimating a residual depth map for each layer wherein each residual depth map defines the distance each pixel of the associated layer is offset from the estimated plane of that layer;
   outputting data representative of the plane equation, sprite image and residual depth map estimates for each layer.

38. The system of claim 37, wherein the opacity of each pixel of each sprite image is characterized in Boolean terms.

39. The system of claim 37, wherein the program module for estimating the plane equation for each layer comprises sub-modules for:
   defining masked images for the layer, wherein each masked image respectively corresponds to a one of the input images and comprises all the pixels assigned to the layer from its corresponding input image;
   warping each of the masked images onto a distinguished image, using a homography derived from a camera projection matrix of the camera responsible for creating the masked image being warped and one of a set of possible plane equations, to create a set of warped images, wherein the distinguished image constitutes the masked image corresponding to a prescribe one of the input images;

comparing each of the set of warped images to each other and the distinguished image to determine a degree of difference between the images;

repeating the warping and comparing steps using another of the possible plane equations; and estimating a plane equation for the layer as that which produces the minimum degree of difference between each of the set of warped images and between each of the set of warped images and the distinguished image.

40. The system of claim 39, wherein the program module for estimating the sprite image for each layer comprises sub-modules for:

warping each masked image onto a plane $n_l^T X=0$ using a homography derived from the homography employed to estimate the plane equation to create a set of warped images;

blending the set of warped images together; and compensating for blurring caused by the blending step.

41. The system of claim 40, wherein the program module for estimating the residual depth map for each layer comprises sub-modules for:

warping each masked image onto a plane $n_l^T X=0$ using a relationship based on the nomography employed to estimate the sprite image for the layer, an epipole and one of a set of possible residual depth maps, to create a set of warped images;

comparing each of the set of warped images to each other to determine a degree of difference between the images;

repeating the warping and comparing steps using another of the possible residual depth maps; and estimating a residual depth map for the layer that will produce the minimum degree of difference between each of the set of warped images.

42. The system of claim 37, wherein the computer program further comprises a program module for re-estimating each layer's sprite image based on the residual depth map associated with that layer.

43. The system of claim 41, wherein the computer program further comprises a program module for re-estimating each layer's sprite image based on the residual depth map associated with that layer, the program module for re-estimating the layer's sprite image comprises sub-modules for:

warping each masked image onto a plane $n_l^T X=0$ using a relationship based on the homography employed to estimate the sprite image for the layer, the epipole and the estimated residual depth map of the layer to create a set of warped images; and blending the set of warped images together to create a re-estimated layer sprite image.

44. The system of claim 37, wherein the camera projection matrices are known and input by a user.

45. The system of claim 37, wherein the camera projection matrices are unknown and computed prior to being input.

46. The system of claim 30, wherein the computer program comprises program modules for:

(a) inputting the plural 2D images as well as camera projection matrices defining the location and orientation of a camera responsible for creating each image respectively;

(b) assigning each pixel making up each 2D image to one of the plural layers;

(c) estimating a plane equation for each layer that defines the orientation and position of that layer in 3D space;

(d) estimating a sprite image for each layer wherein each of the sprite images is defined by a per-pixel color and a per-pixel opacity;

(e) estimating a residual depth map for each layer wherein each residual depth map defines the distance each pixel of the associated layer is offset from the estimated plane of that layer;

(f) re-assigning pixels assigned to a particular layer to another layer by using the estimates for the plane equation, sprite image, and residual depth map for each layer as a guide;

(g) iteratively repeating program modules (c) through (f) for each layer until the change in the value of at least one layer parameter relative to its value in an immediately preceding iteration falls below a prescribed threshold assigned to the parameter, wherein the change in the at least one layer parameter between iterations is indicative of the accuracy of the estimates for the plane equation, sprite image and residual depth map associated the layer; and (h) outputting data representative of the plane equation, sprite image and residual depth map estimates for each layer.

47. The system of claim 46, wherein program module (g) iteratively repeats program modules (c) through (f) for each layer until a change in the number of pixels re-assigned to and from the layer, relative to the number of pixels re-assigned to and from the layer in the immediately preceding iteration, falls below a percentage change threshold.

48. The system of claim 46, wherein program module (g) iteratively repeats program modules (c) through (f) for each layer until a change in the estimate of at least one of the plane equation, sprite image and residual depth map associated the layer, relative to the corresponding estimate in the immediately preceding iteration, falls below a threshold prescribed for the change.

49. The system of claim 46, wherein program module (g) iteratively repeats program modules (c) through (f) for each layer until:

a change in the number of pixels re-assigned to and from the layer, relative to the number of pixels re-assigned to and from the layer in the immediately preceding iteration, falls below a percentage change threshold; and a change in the estimate of at least one of the plane equation, sprite image and residual depth map associated the layer, relative to the corresponding estimate in the immediately preceding iteration, falls below a threshold prescribed for the change.

50. The system of claim 46, wherein the opacity of each pixel of each sprite image is characterized in Boolean terms.

51. The system of claim 46, wherein the program module for estimating the plane equation for each layer comprises sub-modules for:

defining masked images for the layer, wherein each masked image respectively corresponds to a one of the input images and comprises all the pixels assigned to the layer from its corresponding input image;

warping each of the masked images onto a distinguished image, using a homography derived from a camera projection matrix of the camera responsible for creating the masked image being warped and one of a set of possible plane equations, to create a set of warped images, wherein the distinguished image constitutes the masked image corresponding to a prescribe one of the input images;

comparing each of the set of warped images to each other and the distinguished image to determine a degree of difference between the images;

repeating the warping and comparing steps using another of the possible plane equations; and estimating a plane equation for the layer as that which produces the minimum degree of difference between each of the set of warped images and between each of the set of warped images and the distinguished image.

52. The system of claim 51, wherein the program module for estimating the sprite image for each layer comprises sub-modules for:

warping each masked image onto a plane $n_l^T X=0$ using a homography derived from the homography employed to estimate the plane equation to create a set of warped images;

blending the set of warped images together; and compensating for blurring caused by the blending step.

53. The system of claim 52, wherein the program module for estimating the residual depth map for each layer comprises sub-modules for:

warping each masked image onto a plane $n_l^T X=0$ using a relationship based on the homography employed to estimate the sprite image for the layer, an epipole and one of a set of possible residual depth maps, to create a set of warped images;

comparing each of the set of warped images to each other to determine a degree of difference between the images;

repeating the warping and comparing steps using another of the possible residual depth maps; and estimating a residual depth map for the layer that will produce the minimum degree of difference between each of the set of warped images.

54. The system of claim 46, wherein the computer program further comprises a program module for re-estimating each layer's sprite image based on the residual depth map associated with that layer prior to executing program module (f).

55. The system of claim 53, wherein the computer program further comprises a program module for re-estimating each layer's sprite image based on the residual depth map associated with that layer prior to executing program module (f), the program module for re-estimating the layer's sprite image comprising sub-modules for:

warping each masked image onto a plane $n_l^T X=0$ using a relationship based on the homography employed to estimate the sprite image for the layer, the epipole and the estimated residual depth map of the layer to create a set of warped images; and blending the set of warped images together to create a re-estimated layer sprite image.

56. The system of claim 53, wherein the program module for re-assigning pixels to and from each layer comprises sub-modules for:

warping each masked image onto a plane $n_l^T X=0$ using a relationship based on the homography employed to estimate the sprite image for the layer, the epipole and the estimated residual depth map of the layer to create a set of warped images; and blending the set of warped images together to create a full layer sprite image, wherein the full layer sprite image is defined by a per-pixel color and a per-pixel opacity;

computing a measure for each pixel in each of the set of warped images of the likelihood that the pixel is the warped image of a corresponding pixel in the full layer sprite image;

warping each computed measure into each input image to create a warped measure for each pixel of each input image; and re-assigning each pixel of each input image to a layer wherein the warped measure associated with that pixel indicates the highest likelihood that the pixel is the warped image of the corresponding pixel in the full layer sprite.

57. The system of claim 46, wherein the camera projection matrices are known and input by a user.

58. The system of claim 46, wherein the camera projection matrices are unknown and computed prior to being input.

59. A computer-readable memory for causing a computer to extract 3D structure from plural, stereo, 2D images of a scene, comprising:

a computer-readable storage medium; and a computer program comprising program modules stored in the storage medium, wherein the storage medium is so configured by the computer program that it causes the computer to compute from the 2D images input to the computer a representation of the scene comprising plural layers, each of which is characterized by parameters at least including the layer's orientation and position, per-pixel color, per-pixel opacity, and a per-pixel depth defining the distance each pixel associated with the layer is offset from that layer.

60. The computer-readable memory of claim 59, wherein the computer program comprises program modules for:

inputting the plural 2D images as well as camera projection matrices defining the location and orientation of a camera responsible for creating each image respectively;

assigning each pixel making up each 2D image to one of the plural layers;

estimating a plane equation for each layer that defines the orientation and position of that layer in 3D space;

estimating a sprite image for each layer wherein each of the sprite images is defined by a per-pixel color and a per-pixel opacity; and outputting data representative of the plane equation and sprite image estimates for each layer.

61. The computer-readable memory of claim 60, wherein the opacity of each pixel of each sprite image is characterized in Boolean terms.

62. The computer-readable memory of claim 60, wherein the program module for estimating the plane equation for each layer comprises sub-modules for:

defining masked images for the layer, wherein each masked image respectively corresponds to a one of the input images and comprises all the pixels assigned to the layer from its corresponding input image;

warping each of the masked images onto a distinguished image, using a homography derived from a camera projection matrix of the camera responsible for creating the masked image being warped and one of a set of possible plane equations, to create a set of warped images, wherein the distinguished image constitutes the masked image corresponding to a prescribe one of the input images;

comparing each of the set of warped images to each other and the distinguished image to determine a degree of difference between the images;

repeating the warping and comparing steps using another of the possible plane equations; and estimating a plane equation for the layer as that which produces the minimum degree of difference between each of the set of warped images and between each of the set of warped images and the distinguished image.

63. The computer-readable memory of claim 62, wherein the program module for estimating the sprite image for each layer comprises sub-modules for:

warping each masked image onto a plane $n_l^T X=0$ using a homography derived from the homography employed to estimate the plane equation to create a set of warped images;

blending the set of warped images together; and compensating for blurring caused by the blending step.

64. The computer-readable memory of claim 59, wherein the computer program comprises program modules for:

inputting the plural 2D images as well as camera projection matrices defining the location and orientation of a camera responsible for creating each image respectively;

assigning each pixel making up each 2D image to one of the plural layers;

estimating a plane equation for each layer that defines the orientation and position of that layer in 3D space;

estimating a sprite image for each layer wherein each of the sprite images is defined by a per-pixel color and a per-pixel opacity;

estimating a residual depth map for each layer wherein each residual depth map defines the distance each pixel of the associated layer is offset from the estimated plane of that layer;

outputting data representative of the plane equation, sprite image and residual depth map estimates for each layer.

65. The computer-readable memory of claim 64, wherein the opacity of each pixel of each sprite image is characterized in Boolean terms.

66. The computer-readable memory of claim 64, wherein the program module for estimating the plane equation for each layer comprises sub-modules for:

defining masked images for the layer, wherein each masked image respectively corresponds to a one of the input images and comprises all the pixels assigned to the layer from its corresponding input image;

warping each of the masked images onto a distinguished image, using a homography derived from a camera projection matrix of the camera responsible for creating the masked image being warped and one of a set of possible plane equations, to create a set of warped images, wherein the distinguished image constitutes the masked image corresponding to a prescribe one of the input images;

comparing each of the set of warped images to each other and the distinguished image to determine a degree of difference between the images;

repeating the warping and comparing steps using another of the possible plane equations; and estimating a plane equation for the layer as that which produces the minimum degree of difference between each of the set of warped images and between each of the set of warped images and the distinguished image.

67. The computer-readable memory of claim 66, wherein the program module for estimating the sprite image for each layer comprises sub-modules for:

warping each masked image onto a plane $n_l^T X=0$ using a homography derived from the homography employed to estimate the plane equation to create a set of warped images;

blending the set of warped images together; and compensating for blurring caused by the blending step.

68. The computer-readable memory of claim 67, wherein the program module for estimating the residual depth map for each layer comprises sub-modules for:

warping each masked image onto a plane $n_l^T X=0$ using a relationship based on the homography employed to estimate the sprite image for the layer, an epipole and one of a set of possible residual depth maps, to create a set of warped images;

comparing each of the set of warped images to each other to determine a degree of difference between the images;

repeating the warping and comparing steps using another of the possible residual depth maps; and estimating a residual depth map for the layer that will produce the minimum degree of difference between each of the set of warped images.

69. The computer-readable memory of claim 64, wherein the computer program further comprises a program module for re-estimating each layer's sprite image based on the residual depth map associated with that layer.

70. The computer-readable memory of claim 68, wherein the computer program further comprises a program module for re-estimating each layer's sprite image based on the residual depth map associated with that layer, the program module for re-estimating the layer's sprite image comprising sub-modules for:

warping each masked image onto a plane $n_l^T X=0$ using a relationship based on the homography employed to estimate the sprite image for the layer, the epipole and the estimated residual depth map of the layer to create a set of warped images; and blending the set of warped images together to create a re-estimated layer sprite image.

71. The computer-readable memory of claim 59, wherein the computer program comprises program modules for:

(a) inputting the plural 2D images as well as camera projection matrices defining the location and orientation of a camera responsible for creating each image respectively;

(b) assigning each pixel making up each 2D image to one of the plural layers;

(c) estimating a plane equation for each layer that defines the orientation and position of that layer in 3D space;

(d) estimating a sprite image for each layer wherein each of the sprite images is defined by a per-pixel color and a per-pixel opacity;

(e) estimating a residual depth map for each layer wherein each residual depth map defines the distance each pixel of the associated layer is offset from the estimated plane of that layer;

(f) re-assigning pixels assigned to a particular layer to another layer by using the estimates for the plane equation, sprite image, and residual depth map for each layer as a guide;

(g) iteratively repeating program modules (c) through (f) for each layer until the change in the value of at least one layer parameter relative to its value in an immediately preceding iteration falls below a prescribed threshold assigned to the parameter, wherein the change in the at least one layer parameter between iterations is indicative of the accuracy of the estimates for the plane equation, sprite image and residual depth map associated the layer; and (h) outputting data representative of the plane equation, sprite image and residual depth map estimates for each layer.

72. The computer-readable memory of claim 71, wherein program module (g) iteratively repeats program modules (c) through (f) for each layer until a change in the number of pixels re-assigned to and from the layer, relative to the number of pixels re-assigned to and from the layer in the immediately preceding iteration, falls below a percentage change threshold.

73. The computer-readable memory of claim 71, wherein program module (g) iteratively repeats program modules (c) through (f) for each layer until a change in the estimate of at least one of the plane equation, sprite image and residual depth map associated the layer, relative to the corresponding estimate in the immediately preceding iteration, falls below a threshold prescribed for the change.

74. The computer-readable memory of claim 71, wherein program module (g) iteratively repeats program modules (c) through (f) for each layer until:
a change in the number of pixels re-assigned to and from the layer, relative to the number of pixels re-assigned to and from the layer in the immediately preceding iteration, falls below a percentage change threshold; and
a change in the estimate of at least one of the plane equation, sprite image and residual depth map associated the layer, relative to the corresponding estimate in the immediately preceding iteration, falls below a threshold prescribed for the change.

75. The computer-readable memory of claim 71, wherein the opacity of each pixel of each sprite image is characterized in Boolean terms.

76. The computer-readable memory of claim 71, wherein the program module for estimating the plane equation for each layer comprises sub-modules for:
defining masked images for the layer, wherein each masked image respectively corresponds to a one of the input images and comprises all the pixels assigned to the layer from its corresponding input image;
warping each of the masked images onto a distinguished image, using a nomography derived from a camera projection matrix of the camera responsible for creating the masked image being warped and one of a set of possible plane equations, to create a set of warped images, wherein the distinguished image constitutes the masked image corresponding to a prescribe one of the input images;
comparing each of the set of warped images to each other and the distinguished image to determine a degree of difference between the images;
repeating the warping and comparing steps using another of the possible plane equations; and
estimating a plane equation for the layer as that which produces the minimum degree of difference between each of the set of warped images.

77. The computer-readable memory of claim 76, wherein the program module for estimating the sprite image for each layer comprises sub-modules for:
warping each masked image onto a plane $n_l^T X=0$ using a homography derived from the homography employed to estimate the plane equation to create a set of warped images;
blending the set of warped images together; and
compensating for blurring caused by the blending step.

78. The computer-readable memory of claim 77, wherein the program module for estimating the residual depth map for each layer comprises sub-modules for:
warping each masked image onto a plane $n_l^T X=0$ using a relationship based on the homography employed to estimate the sprite image for the layer, an epipole and one of a set of possible residual depth maps, to create a set of warped images;
comparing each of the set of warped images to each other to determine a degree of difference between the images;
repeating the warping and comparing steps using another of the possible residual depth maps; and
estimating a residual depth map for the layer that will produce the minimum degree of difference between each of the set of warped images.

79. The computer-readable memory of claim 71, wherein the computer program further comprises a program module for re-estimating each layer's sprite image based on the residual depth map associated with that layer prior to executing program module (f).

80. The computer-readable memory of claim 78, wherein the computer program further comprises a program module for re-estimating each layer's sprite image based on the residual depth map associated with that layer prior to executing program module (f), the program module for re-estimating the layer's sprite image comprising sub-modules for:
warping each masked image onto a plane $n_l^T X=0$ using a relationship based on the nomography employed to estimate the sprite image for the layer, the epipole and the estimated residual depth map of the layer to create a set of warped images; and
blending the set of warped images together to create a re-estimated layer sprite image.

81. The computer-readable memory of claim 78, wherein the program module for re-assigning pixels to and from each layer comprises sub-modules for:
warping each masked image onto a plane $n_l^T X=0$ using a relationship based on the homography employed to estimate the sprite image for the layer, the epipole and the estimated residual depth map of the layer to create a set of warped images; and
blending the set of warped images together to create a full layer sprite image, wherein the full layer sprite image is defined by a per-pixel color and a per-pixel opacity;
computing a measure for each pixel in each of the set of warped images of the likelihood that the pixel is the warped image of a corresponding pixel in the full layer sprite image;
warping each computed measure into each input image to create a warped measure for each pixel of each input image; and
re-assigning each pixel of each input image to a layer wherein the warped measure associated with that pixel indicates the highest likelihood that the pixel is the warped image of the corresponding pixel in the full layer sprite.

* * * * *

UNITED STATES PATENT AND TRADEMARK OFFICE
CERTIFICATE OF CORRECTION

PATENT NO. : 6,348,918 B1
DATED : February 19, 2002
INVENTOR(S) : Szeliski et al.

It is certified that error appears in the above-identified patent and that said Letters Patent is hereby corrected as shown below:

Column 1,
Line 58, delete "nsegmentation" and substitute -- segmentation -- after "past"

Column 6,
Line 32, delete "("

Column 7,
Line 33, equation should appear as follows:
-- $P_k\ _{pk\ =\ 0}$ --
Line 36, delete "$s_2$" and substitute -- $s$, -- after "for"
Line 44, delete "$P_k$'" and substitute -- $P_{k'}$ -- after "camera"
Line 47, insert -- "." -- before "Equation"

Column 8,
Line 38, delete "$u_l$" and substitute -- $u_k$ -- after "coordinates"
Line 16, delete "Laver" and substitute -- Layer -- after "of"

Column 12,
Line 9, delete "$Z_l$.," and substitute -- $Z_l$, -- after "and"

Column 18,
Line 15, delete "nomography" and substitute -- homography --

Column 27,
Line 45, delete "nomography" and substitute -- homography --

UNITED STATES PATENT AND TRADEMARK OFFICE
CERTIFICATE OF CORRECTION

PATENT NO. : 6,348,918 B1
DATED : February 19, 2002
INVENTOR(S) : Szeliski et al.

It is certified that error appears in the above-identified patent and that said Letters Patent is hereby corrected as shown below:

<u>Column 28,</u>
Line 34, delete "nomography" and substitute -- homography --

Signed and Sealed this

Fourth Day of November, 2003

JAMES E. ROGAN
*Director of the United States Patent and Trademark Office*